United States Patent [19]

Eida et al.

[11] Patent Number: 5,167,703

[45] Date of Patent: Dec. 1, 1992

[54] INK, INK-JET RECORDING PROCESS AND INSTRUMENT MAKING USE OF THE INK

[75] Inventors: Tsuyoshi Eida, Yokohama; Mayumi Yamamoto, Tokyo; Takao Yamamoto, Isehara, all of Japan

[73] Assignee: Canon Kabushiki Kaisha, Tokyo, Japan

[21] Appl. No.: 798,948

[22] Filed: Nov. 27, 1991

[30] Foreign Application Priority Data

Nov. 30, 1990 [JP] Japan .................. 2-338758
Nov. 30, 1990 [JP] Japan .................. 2-338761

[51] Int. Cl.$^5$ ............................ C09D 11/02
[52] U.S. Cl. ............... 106/22 K; 534/680; 534/810; 534/811; 534/812; 534/815; 346/1.1
[58] Field of Search ........... 106/22; 534/680, 810, 534/811, 812, 815; 346/1.1

[56] References Cited

U.S. PATENT DOCUMENTS

| | | | |
|---|---|---|---|
| 4,097,476 | 6/1978 | Wicki | 534/815 |
| 4,426,226 | 1/1984 | Ohta et al. | 106/22 |
| 4,557,761 | 12/1985 | Kobayashi et al. | 106/22 |
| 4,592,756 | 6/1986 | Kawasaki et al. | 106/22 |
| 4,661,158 | 4/1987 | Kobayashi et al. | 106/22 |
| 4,670,548 | 6/1987 | Westphal et al. | 534/811 |
| 4,734,489 | 3/1988 | Kawasaki et al. | 106/22 |
| 4,737,240 | 4/1988 | Davis et al. | 534/815 |
| 4,765,838 | 8/1988 | Ohata et al. | 106/22 |
| 4,804,411 | 2/1989 | Eida et al. | 106/22 |
| 4,841,037 | 6/1989 | Ohta et al. | 106/22 |
| 5,017,227 | 5/1991 | Koike et al. | 106/22 |
| 5,082,496 | 1/1992 | Yamamoto et al. | 106/22 |

FOREIGN PATENT DOCUMENTS 0422668 4/1991 European Pat. Off. .
3619573 12/1986 Fed. Rep. of Germany .

Primary Examiner—Mark L. Bell
Assistant Examiner—Helene Klemanski
Attorney, Agent, or Firm—Fitzpatrick, Cella, Harper & Scinto

[57] ABSTRACT

Provided is an ink comprising at least water, a water-soluble organic solvent, and a dye, the dye comprising a compound represented by the general formula (I):

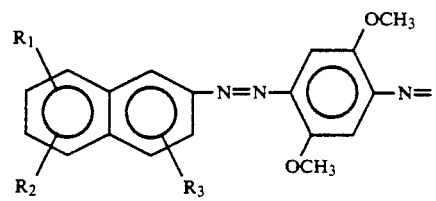

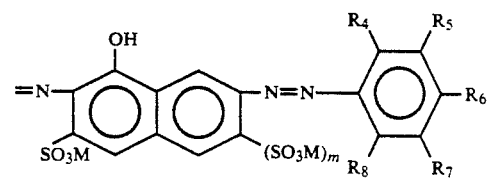

wherein $R_1$, $R_2$, and $R_3$ are respectively hydrogen or $SO_3M$; $R_4$ is hydrogen, $OCH_3$, $NH_2$, $NHCONH_2$, or $SO_3M$; $R_5$ is hydrogen or $SO_3M$; $R_6$ is hydrogen or $NH_2$; $R_7$ is hydrogen, $CH_3$, or $OCH_3$; $R_8$ is hydrogen, COOM, or $SO_3M$; $R_5$ is hydrogen and $R_8$ is COOM when both of $R_4$ and $R_6$ are respectively $NH_2$; M is an alkali metal, ammonium, or organic ammonium; and m is 0 or 1, or a compound represented by the general formula (II):

wherein $R_1$ is hydrogen, $CH_3$, COOM, or $SO_3M$; $R_2$ is hydrogen, $CH_3$, or COOM; $R_3$ is hydrogen, chlorine, COOM, or $SO_3M$; $R_4$ is hydrogen, $OCH_3$, $NH_2$, $NHCONH_2$, or $SO_3M$; $R_5$ is hydrogen or $SO_3M$; $R_6$ is hydrogen or $NH_2$; $R_7$ is hydrogen, $CH_3$, or $OCH_3$; $R_8$ is hydrogen, COOM, or $SO_3M$; $R_5$ is hydrogen and $R_8$ is COOM when both of $R_4$ and $R_6$ are respectively $NH_2$; M is an alkali metal, ammonium, or organic ammonium, and m is 0 or 1.

62 Claims, 2 Drawing Sheets

INK, INK-JET RECORDING PROCESS AND INSTRUMENT MAKING USE OF THE INK

BACKGROUND OF THE INVENTION

1. Field of the Invention

The present invention relates to an ink, an ink jet recording method, and an instrument employing the ink. More particularly, the present invention relates to an ink which provides an excellent water-resistant printed image on non-coated paper, and provides a printed image having improved resistance against indoor discoloration on coated paper (paper having a pigment-coating layer), and an ink jet recording process, an ink jet device, an ink jet recording apparatus, and an ink cartridge employing the above ink.

2. Related Background Art

A variety of ink compositions are hitherto known for ink jet recording. In recent years, research and development have been comprehensively made improve the composition and the properties of the ink to conduct satisfactory recording on non-coated paper such as paper for copying, paper for reporting, notebooks, letter paper, bond paper, continuous business forms, and the like.

For example, inks involve the problems as below. Inks generally contain a high-boiling organic solvent such as glycol for prevention of drying-up and clogging. When printing is conducted on a recording medium with such an ink, the printed image run and become blurred, or scraped caused by sweat, a water drop, or the like, since the coloring matter used in the ink is a water-soluble dye. Further, full-color images which are printed on coated paper for forming the image clearly, come to be discolored disadvantageously even in a room where the direct sun light illumination is excluded, although sufficient light-fastness and weatherability are required to the color images.

SUMMARY OF THE INVENTION

The present invention intends to provides an ink which provides printed images with sufficient durability on non-coated paper, and provides printed images with little discoloration on coated paper.

The present invention further provides an ink jet recording method and an instrument employing the ink.

The present invention provides an ink comprising at least water, a water-soluble organic solvent, and a dye, the dye comprising a compound represented by the general formula (I):

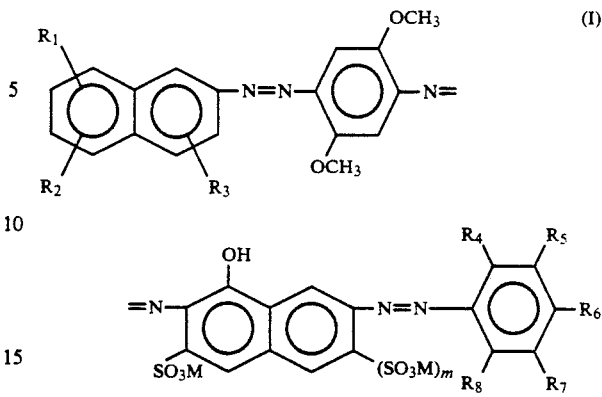

wherein $R_1$, $R_2$, and $R_3$ are respectively hydrogen or $SO_3M$; $R_4$ is hydrogen, $OCH_3$, $NH_2$, $NHCONH_2$, or $SO_3M$; $R_5$ is hydrogen or $SO_3M$; $R_6$ is hydrogen or $NH_2$; $R_7$ is hydrogen, $CH_3$, or $OCH_3$; $R_8$ is hydrogen, $COOM$, or $SO_3M$; $R_5$ is hydrogen and $R_8$ is $COOM$ when both of $R_4$ and $R_6$ are respectively $NH_2$; M is an alkali metal, ammonium, or organic ammonium; and m is 0 or 1.

The present invention also provide an ink comprising at least water, a water-soluble organic solvent, and a dye, the dye comprising a compound represented by the general formula (II):

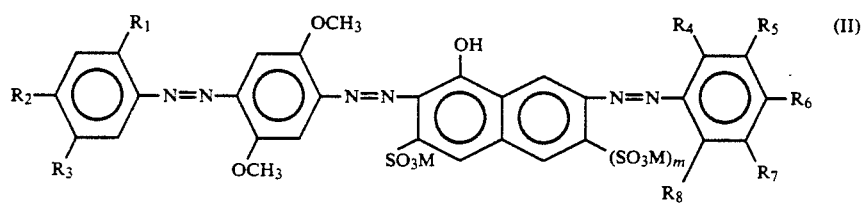

wherein $R_1$ is hydrogen, $CH_3$, $COOM$, or $SO_3M$; $R_2$ is hydrogen, $CH_3$, or $COOM$; $R_3$ is hydrogen, chlorine, $COOM$, or $SO_3M$; $R_4$ is hydrogen, $OCH_3$, $NH_2$, $NHCONH_2$, or $SO_3M$; $R_5$ is hydrogen or $SO_3M$; $R_6$ is hydrogen or $NH_2$; $R_7$ is hydrogen, $CH_3$, or $OCH_3$; $R_8$ is hydrogen, $COOM$, or $SO_3M$; $R_5$ is hydrogen and $R_8$ is $COOM$ when both of $R_4$ and $R_6$ are respectively $NH_2$; M is an alkali metal, ammonium, or organic ammonium; and m is 0 or 1.

The present invention still also provides an ink jet recording process for conducting recording by ejecting ink droplets from an orifice in response to a recording signal, wherein the ink as described above is used.

The present invention further provides an ink jet device comprising an ink storing member impregnated with a recording liquid, and a head having an orifice for ejecting the recording liquid as droplets, wherein the ink as described above is used.

The present invention still further provides an ink jet recording apparatus comprising an ink jet device comprising an ink storing member impregnated with a recording liquid, and a head having an orifice for ejecting the recording liquid, wherein the ink as described above is used.

The present invention still further provides an ink cartridge comprising an ink bag impregnated with a recording liquid comprising an ink, wherein the ink as described above is used.

DETAILED DESCRIPTION OF THE PREFERRED EMBODIMENTS

Figure 1A:
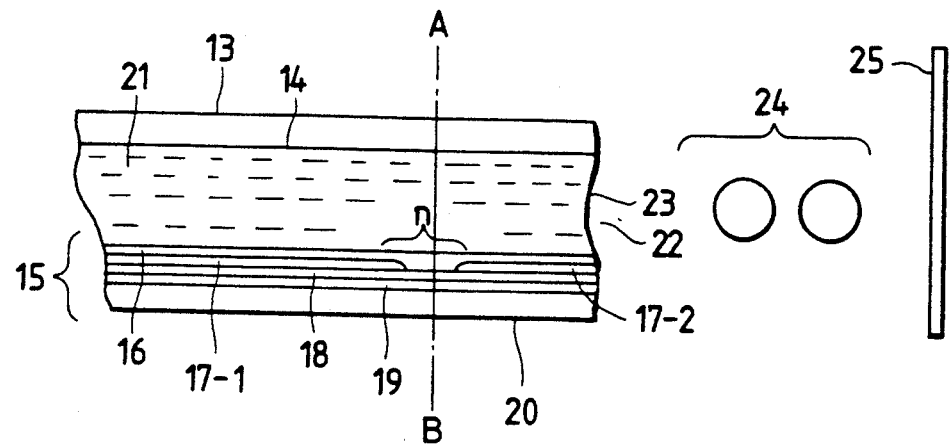
FIG. 1A and FIG. 1B illustrate a longitudinal cross section and a transverse cross section, respectively, of a head of an ink jet recording apparatus.

Preferred embodiments are described below in detail.

The present invention is characterized mainly by use of a dye having a specified structure as the coloring material of ink, thereby providing an ink which gives durable printed images on various non-coated paper and gives less discoloring images on coated paper, and providing also an ink jet recording method and instruments employing the ink.

The dyes represented by the general formulae (I) and (II), which are used in the present invention and mainly characterizing the present invention, include any of the dyes of the above general formulae, and may be used singly or in combination of two or more thereof. Further, the dye may be used in combination with another dye which is not included in the dyes of the above general formulae.

Among the dyes of the general formula (I), particularly preferred are those shown below:

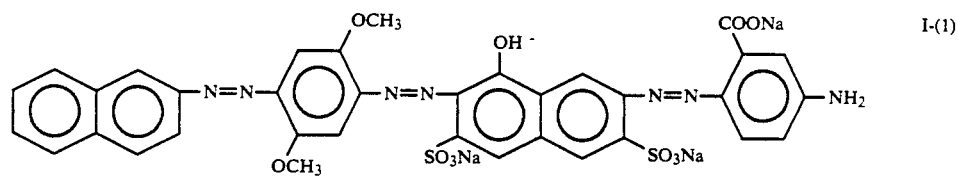
I-(1)

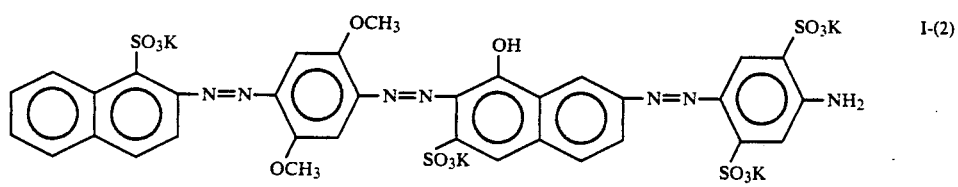
I-(2)

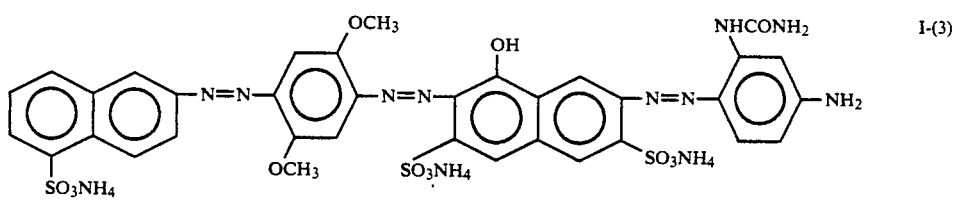
I-(3)

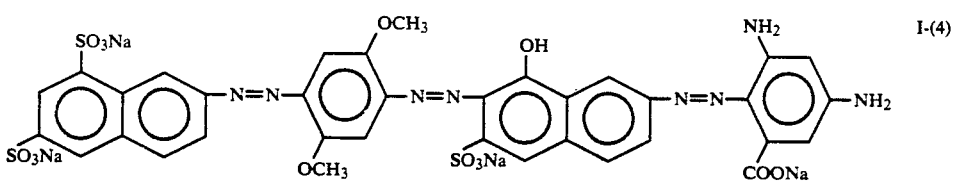
I-(4)

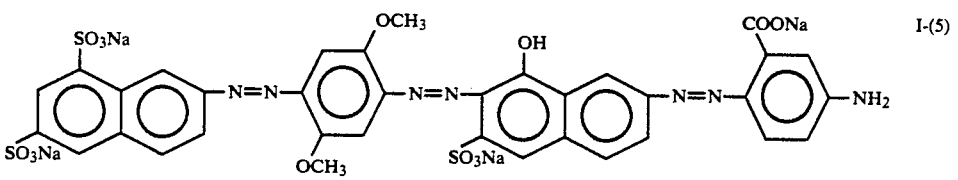
I-(5)

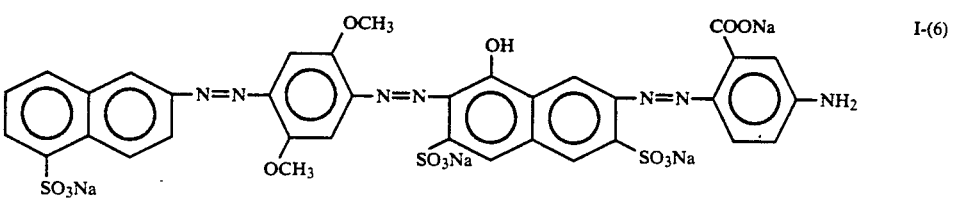
I-(6)

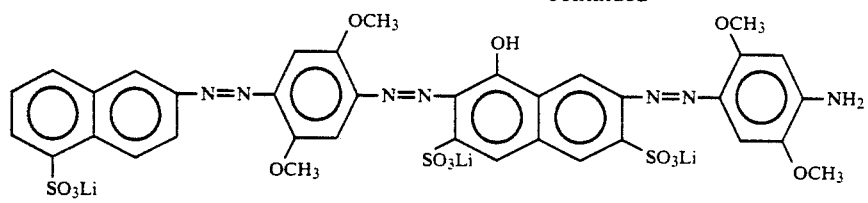
I-(7)
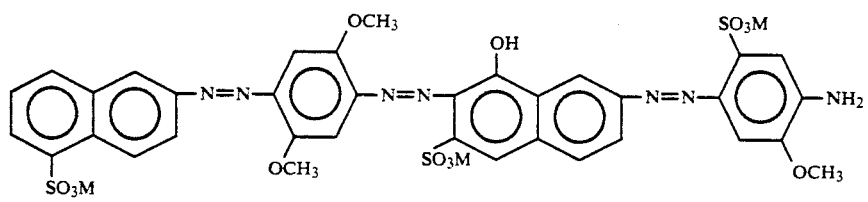
I-(8)
M = NH$_2$(C$_2$H$_4$OH)$_2$
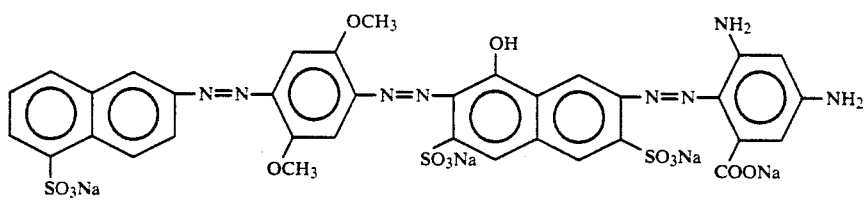
I-(9)
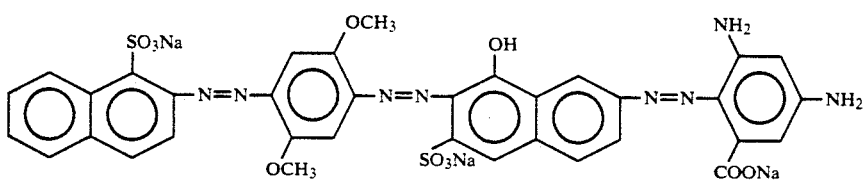
I-(10)
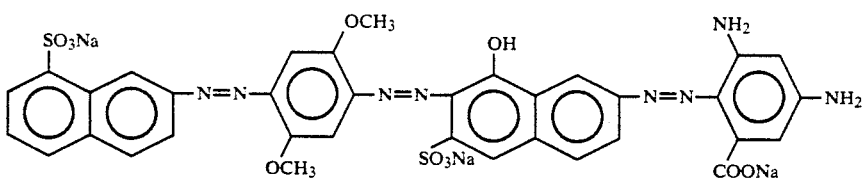
I-(11)
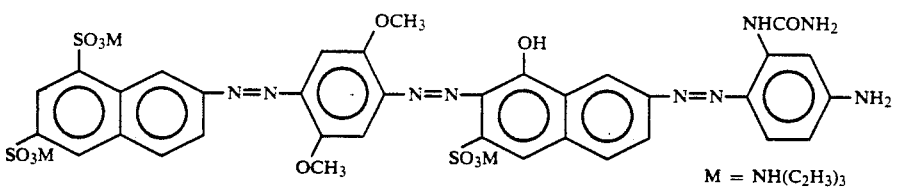
(I-(12)
M = NH(C$_2$H$_3$)$_3$
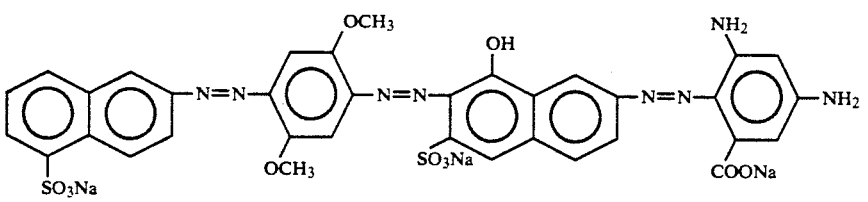
I-(13)
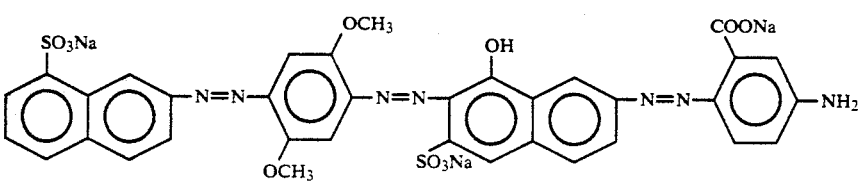
I-(14)

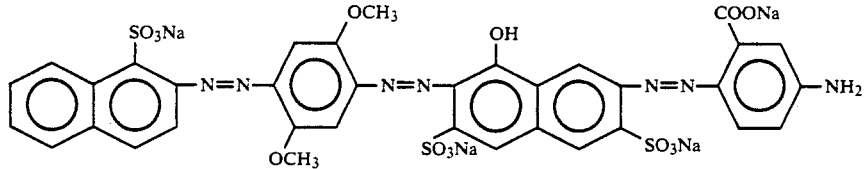
I-(15)
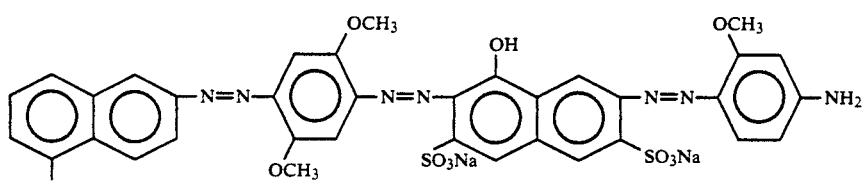
I-(16)
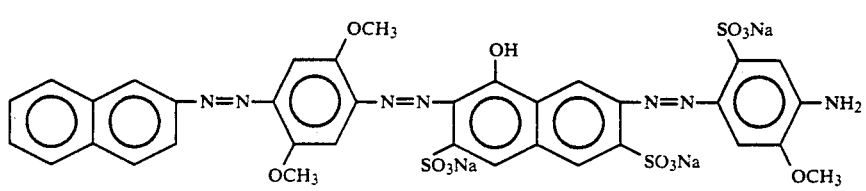
I-(17)
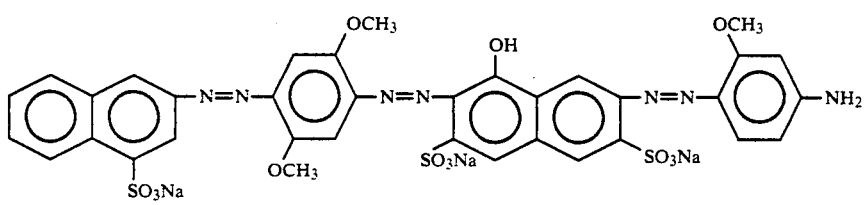
I-(18)
Among the dyes of the general formula (II), particularly preferred are those shown below:
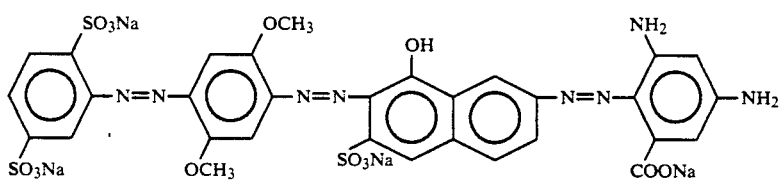
II-(1)
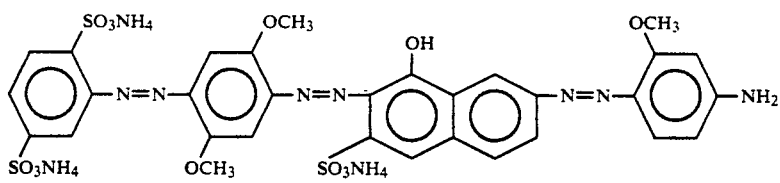
II-(2)
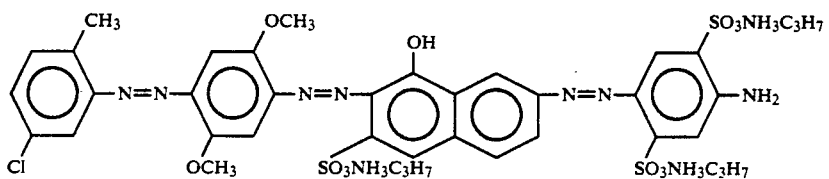
II-(3)
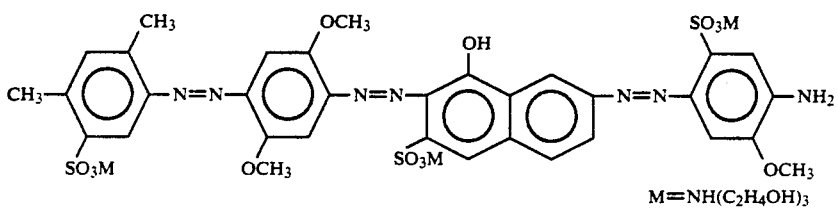
II-(4)
$M = NH(C_2H_4OH)_3$ -continued
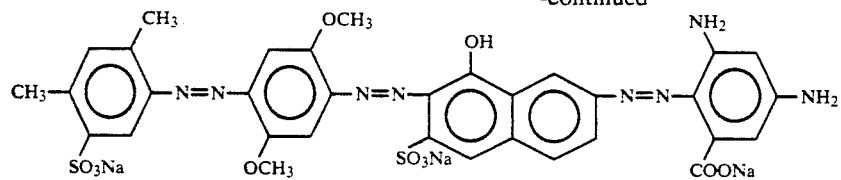 II-(5)
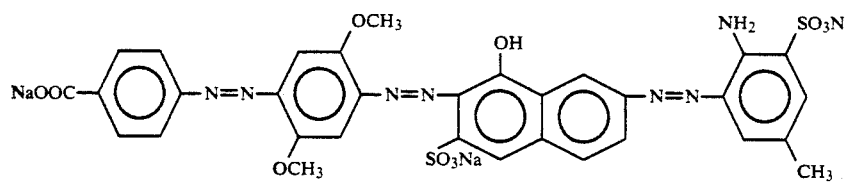 II-(6)
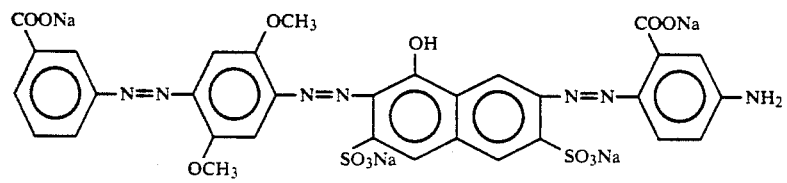 II-(7)
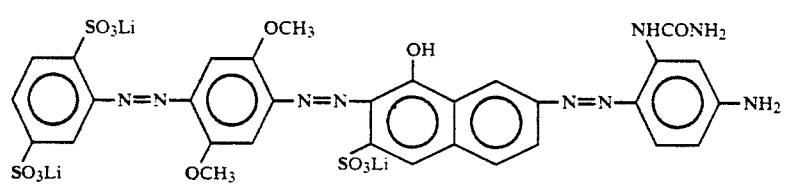 II-(8)
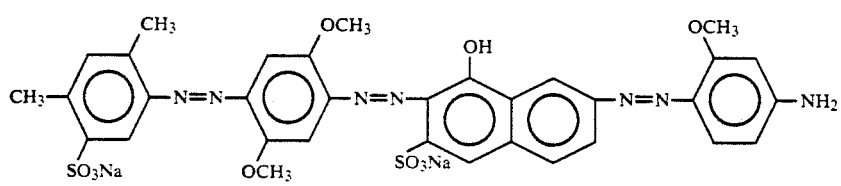 II-(9)
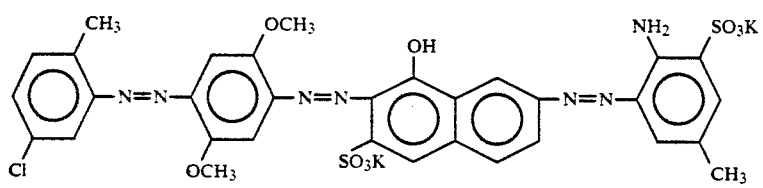 II-(10)
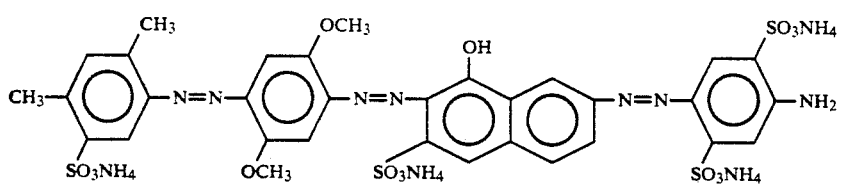 II-(11)
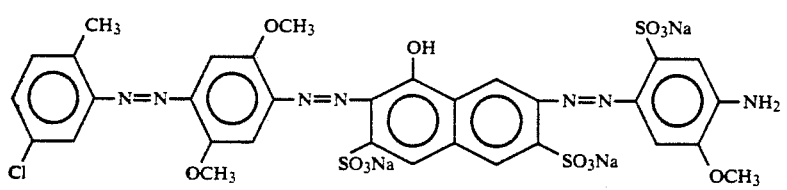 II-(12)
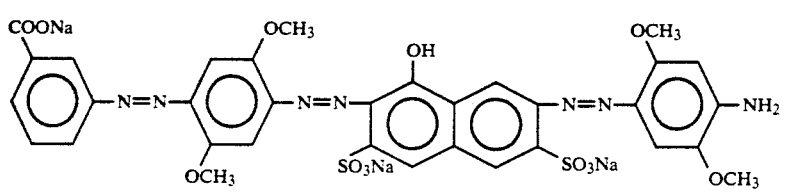 II-(13)

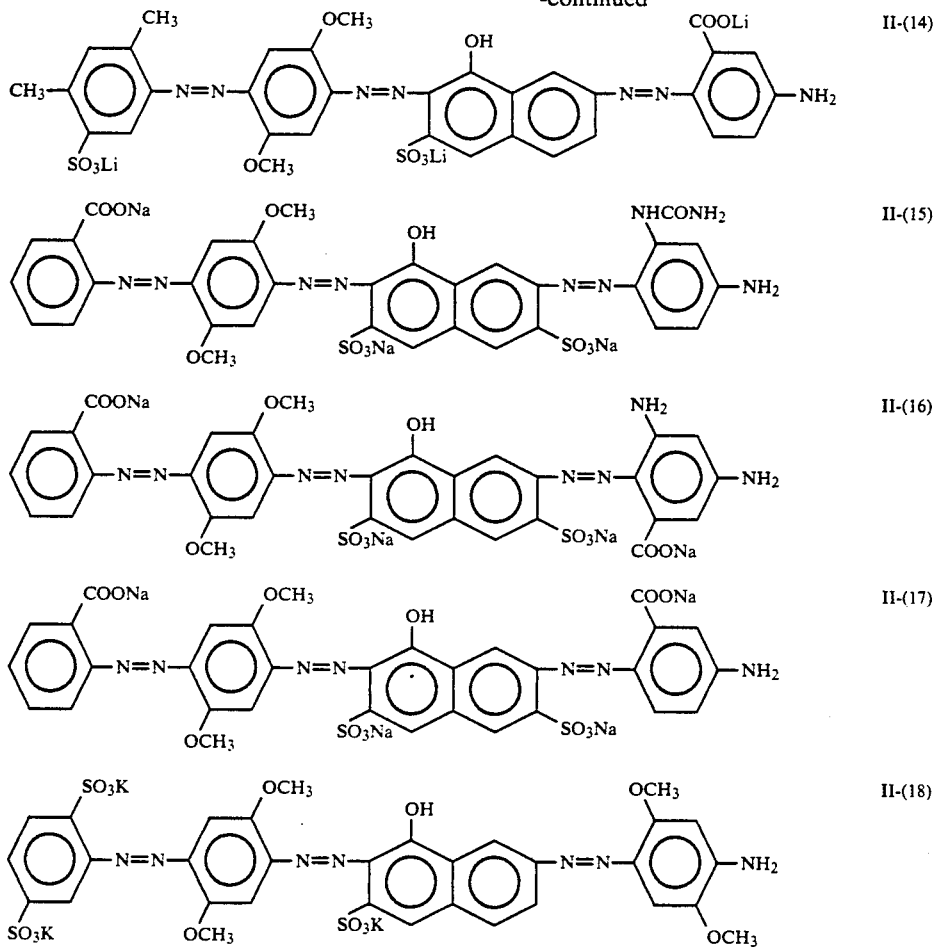

Among the dyes shown above, particularly preferred ones, in view of the effect of the present invention, are the compounds represented by the general formula (I) in which one of $R_1$, $R_2$, and $R_3$ is $SO_3M$, m is 0, and two or three $SO_3M$ groups in total are contained, and the compounds represented by the general formula (II) in which none or one of $R_1$, $R_2$, and $R_3$ is $SO_3M$, none or one of $R_4$, $R_5$, $R_6$, $R_7$, and $R_8$ is $SO_3M$, m is 0, and two or three $SO_3M$ groups in total are contained.

The content of the dye in the ink depends on the kinds of the components of the liquid medium and the properties required to the ink. Generally, the content is in the range of from about 0.2 to about 20% by weight, preferably from 0.5 to 10% by weight, more preferably from 1 to 5% by weight of the whole ink.

The liquid medium used in the present invention is a mixture of water and a water-soluble organic solvent. The water may be ordinary water but is preferably deionized water. The organic solvent includes alkyl alcohols having 1 to 5 carbons such as methyl alcohol, ethyl alcohol, n-propyl alcohol, isopropyl alcohol, n-butyl alcohol, sec-butyl alcohol, tert-butyl alcohol, iso-butyl alcohol, n-pentanol, etc., and halogenated derivatives thereof; amides such as dimethylformamide, dimethylacetamide, etc.; ketones and ketoalcohols such as acetone, diacetone alcohol, etc.; ethers such as tetrahydrofuran, dioxane, etc.; oxyethylene or oxypropylene addition products such as diethylene glycol, triethylene glycol, tetraethylene glycol, dipropylene glycol, tripropylene glycol, polyethylene glycol, polypropylene glycol, etc.; alkylene glycols having alkylene group of 2 to 6 carbons such as ethylene glycol, propylene glycol, trimethylene glycol, butylene glycol, 1,2,6-hexane triol, hexylene glycol, etc.; thiodiglycol; glycerin; ethers of a polyhydric alcohol with a lower alkyl such as ethylene glycol monomethyl (or monoethyl) ether, diethylene glycol monomethyl (or monoethyl) ether, triethylene glycol monomethyl (or monoethyl) ether, etc.; diethers of a polyhydric alcohol with a lower alkyl such as triethylene glycol dimethyl (or diethyl) ether, tetraethylene glycol dimethyl (or diethyl) ether, etc.; sulfolane, N-methyl-2-pyrrolidone, 1,3-dimethyl-2-imidazolidinone, and the like.

The content of the aforementioned water soluble organic solvent is generally in the range of from 2 to 50%, preferably 2 to 30% by weight of the whole ink. The solvent may be used singly or in combination of two or more thereof.

The main constituents of the ink of the present invention is described above. Other additives such as a dispersant, a surfactant, a viscosity controlling agent, a surface tention controlling agent, a fluorescent whitening agent, and the like may be added to the ink, if necessary, within the range that the object of the present invention is achieved. The examples are viscosity controlling agents such as polyvinyl alcohol, cellulose derivatives; various surface active agents of cation type, anion type, and nonion type; surface tension controlling agents such as diethanolamine, and triethanolamine; pH controlling agents such as buffer solutions; mildewproofing agents; and the like.

For formulation of the ink used for ink jet recording which gives electric charge to the ink, there is added a resistivity controlling agent such as inorganic salts including lithium chloride, ammonium chloride, sodium chloride.

The ink of the present invention is particularly suitable for an ink jet recording method of recording by ejecting ink droplets by a bubbling phenomenon upon thermal energy, and has the characteristic of stabilizing the ink ejection without causing satellite dots or other disadvantages. In this case, thermal properties such as specific heat, thermal expansion coefficient, and thermal conductivity may be adjusted, if necessary.

The ink itself of the present invention is desirably adjusted to have a surface tension at 25° C. of from 30 to 68 dyne/cm, and a viscosity at 25° C. of not more than 15 cP, preferably not more than 10 cP, more preferably not more than 5 cP for the purpose of solving the problems of running of the ink, drying property of recorded images, and permeability of ink on non-coated paper or other recording mediums, and for the purpose of improving the matching of the ink with an ink jet head.

In order to adjust the properties of the ink as above and to solve the problems in recording on non-coated paper, the water content in the ink of the present invention made to be in the range of from 50 to 95% by weight, preferably from 60 to 90% by weight.

The ink of the present invention, which is particularly suitable for an ink jet recording method for recording by ejecting ink droplets by thermal energy, is naturally useful also for general writing utensils.

The methods and the apparatus suitable for the use of the ink of the present invention are those that provide thermal energy to ink in a cell in a recording head in correspondence with recording signals to form ink droplets by the thermal energy.

Figure 1B:
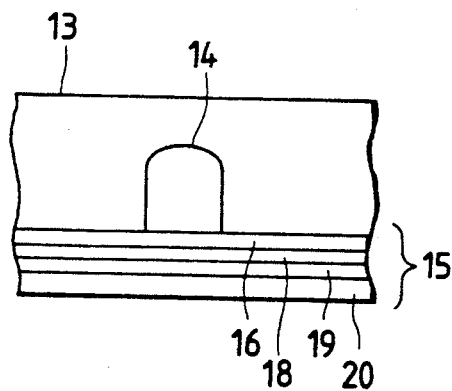
Figure 2:
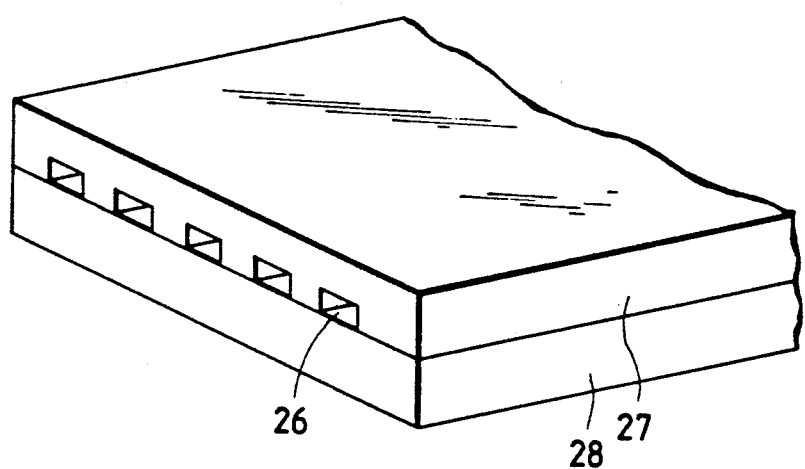
FIG. 2 is a perspective illustration of the appearance of a head having a multiple set of the heads as shown in FIG. 1A and 1B.

An example of the constitution of the heads, which is a main portion of the apparatus, is shown in FIG. 1A, FIG. 1B, and FIG. 2.

A head 13 is formed by bonding a plate of glass, ceramics, or plastics having a groove 14 with a heat-generating head 15. (The type of the head is not limited to the one shown in the drawing.) The heat-generating head 15 is constituted of a protection layer 16 formed of silicon oxide or the like, aluminum electrodes 17-1 and 17-2, a heat-generating resistance layer 18 formed of nichrome or the like, a heat accumulation layer 19, and a substrate plate 20 having heat-releasing property made of alumina or the like.

Ink 21 reaches the ejection orifice 22 (a fine pore), forming a meniscus by action of pressure P not shown in the figure.

On application of an electric signal to the electrodes 17-1 and 17-2, the region designated by a symbol "n" on the heat-generation head 15 abruptly generates heat to form a bubble in the ink 21 at the position adjacent thereto. The pressure generated by the bubble pushes out the meniscus 23 and ejects the ink 21, as recording droplet 24, and the ink droplets are propelled to a recording medium 25. FIG. 2 illustrates exterior appearance of a multi-head constructed by juxtaposing a multiplicity of heads shown in FIG. 1A. The multi-head is prepared by bonding a glass plate having multi-grooves with a heat-generation head 28 similar to the one described in FIG. 1A.

Incidentally, FIG. 1A is a cross-sectional view of the head 13 along an ink flow path, and FIG. 1B is a cross-sectional view of the head at the line A-B in FIG. 1A.

Figure 3:
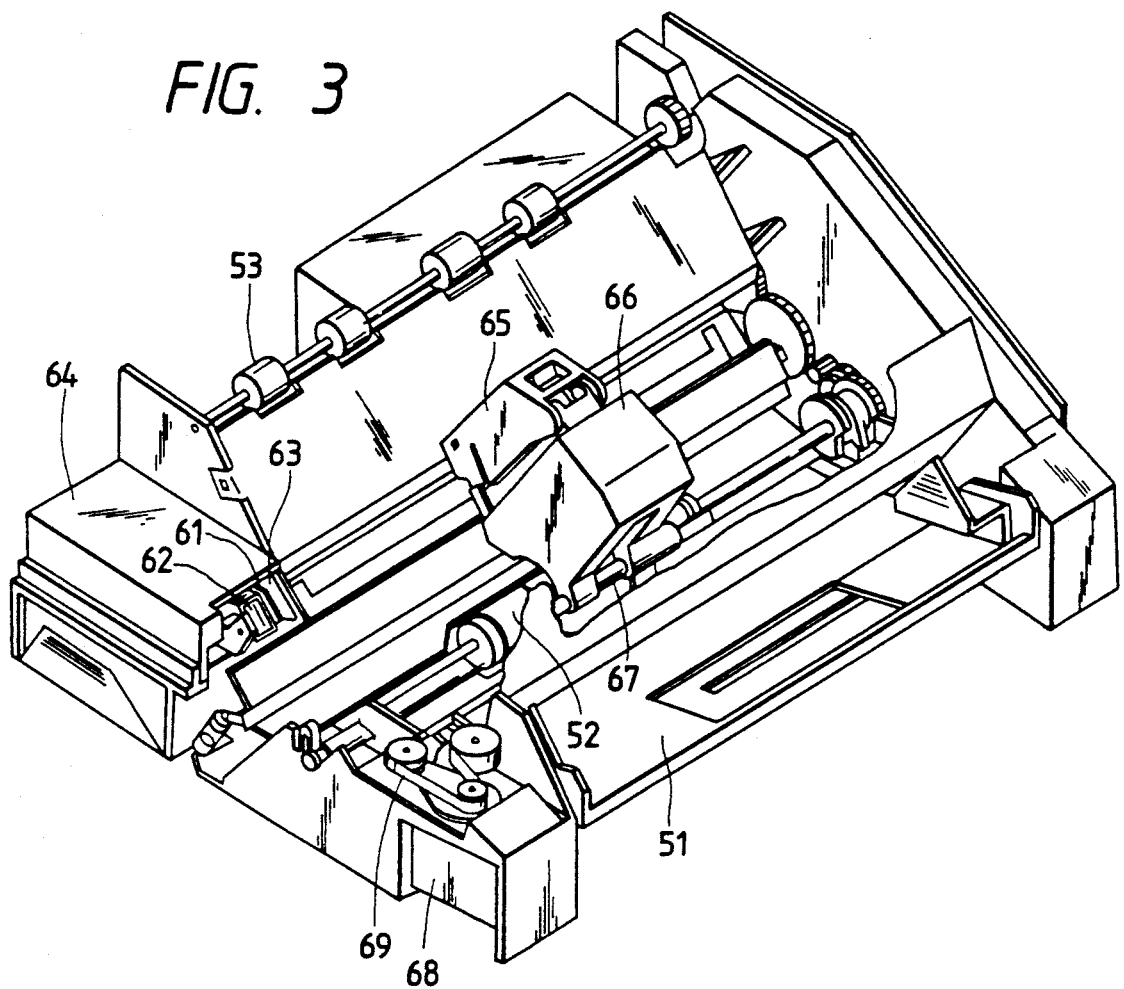
FIG. 3 is a perspective illustration of an example of an ink jet recording apparatus.

FIG. 3 illustrates an example of the ink-jet recording apparatus having such a head mounted therein.

In FIG. 3, a blade 61 as a wiping member is held at one end by a blade-holding member, forming a fixed end in a shape of a cantilever. The blade 61 is placed at a position adjacent to the recording region of the recording head, and in this example, is held so as to protrude into the moving path of the recording head. A cap 62 is placed at a home position adjacent to the blade 61, and is constituted such that it moves in the direction perpendicular to the moving direction of the recording head to come into contact with the ejection nozzle face to cap the nozzles. An ink absorption member 63 is provided at a position adjacent to the blade 61, and is held so as to protrude into the moving path of the recording head in a manner similar to that of the blade 61. The aforementioned blade 61, the cap 62, the absorption member 63 constitute an ejection-recovery section 64, the blade 61 and the absorption member 63 remove water, dust, and the like from the ink ejecting nozzle face.

A recording head 65 has an ejection energy generation means for ejection, and conducts recording by ejecting ink toward a recording medium opposing to the ejection nozzle face. A carriage 66 is provided for supporting and moving the recording head 65. The carriage 66 is engaged slideably with a guide rod 67. A portion of the carriage 66 is connected (not shown in the figure) to a belt 69 driven by a motor 68, so that the carriage 66 is movable along the guide rod 67 to the recording region of the recording head and the adjacent region thereto.

The constitution of a paper delivery portion 51 for delivery of a recording medium and a paper delivery roller 52 driven by a motor not shown in the figure delivers the recording medium to the position opposing to the ejecting nozzle face of the recording head, and the recording medium is discharged with the progress of the recording to paper discharge portion provided with paper-discharge rollers 53.

In the above constitution, the cap 62 of the ejection-recovery portion 64 is out of the moving path of the recording head 65, while the blade 61 is made to protrude into the moving path. Therefore, the ejecting nozzle face of the recording head 65 is wiped therewith. The cap 62 moves to protrude toward the moving path of the recording head when the cap 62 comes into contact for capping with the ejecting nozzle face of the recording head.

At the time when the recording head 65 moves from the home position to the record-starting position, the cap 62 and the blade 61 are at the same position as in the above-mentioned wiping time, so that the ejection nozzle face of the recording head is wiped also in this movement.

The recording head moves to the home position not only at the end of the recording and at the time of ejection recovery, but also at a predetermined interval during movement for recording in the recording region. By such movement, the wiping is conducted.

Figure 4:
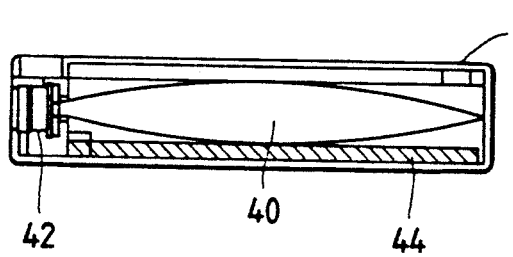
FIG. 4 is a longitudinal cross-sectional illustration of an ink cartridge.

FIG. 4 illustrates an example of the ink cartridge containing ink to be supplied through an ink supplying member such as a tube. The ink container portion 40, for example an ink bag, contains an ink to be supplied, and has a rubber plug 42 at the tip. By inserting a needle (not shown in the drawing) into the plug 42, the ink in the ink bag 40 becomes suppliable. An absorption member 44 absorbs waste ink.

The ink container portion has preferably a liquid-contacting face made of polyolefin, especially polyethylene in the present invention.

The ink-jet recording apparatus used in the present invention is not limited to the above-mentioned one which has separately a head and an ink cartridge. Integration thereof as shown in FIG. 5 may suitably be used.

Figure 5:
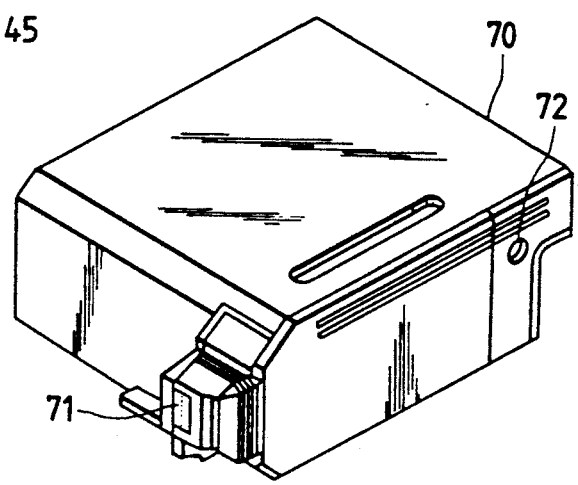
FIG. 5 is a perspective illustration of a recording device.

In FIG. 5, a recording device 70 houses an ink container portion such as an ink absorption member, and the ink in the ink absorption member is ejected from a head 71 having a plurality of orifices. The material for the ink absorption member is preferably polyurethane in the present invention.

Air-communication opening 72 is provided to communicate the interior of the cartridge with the open air.

The recording device 70 may be used in place of the recording head shown in FIG. 3, and is readily mountable to and demountable from the carriage 66.

The present invention is described in more detail referring to example and comparative examples. The "part(s)" and "%" in the description are based on weight unless otherwise mentioned.

EXAMPLES 1 to 10 and COMPARATIVE EXAMPLES 1 and 2

The components shown below were mixed and dissolved, and the resulting solution was filtered under pressure through a filter having pores of 1 μm in diameter to obtain the inks of the examples and the comparative examples as shown in Table 1.

TABLE 1

| Example 1 | | |
|---|---|---|
| Diethylene glycol | 25 | parts |
| Pure water | 72 | parts |
| Exemplified dye I-(1) | 3 | Parts |
| Example 2 | | |
| Diethylene glycol | 30 | parts |
| Pure water | 67 | parts |
| Exemplified dye I-(2) | 3 | Parts |
| Example 3 | | |
| Ethylene glycol | 20 | parts |
| Pure water | 76 | parts |
| Exemplified dye I-(4) | 4 | Parts |
| Example 4 | | |
| Glycerin | 20 | parts |
| Pure water | 75 | parts |
| Exemplified dye I-(6) | 5 | parts |
| Example 5 | | |
| Triethylene glycol | 25 | parts |
| Ethylene glycol monomethyl ether | 15 | parts |
| Pure water | 55 | part |
| Exemplified dye I-(9) | 5 | Parts |
| Example 6 | | |
| Glycerin | 20 | pars |
| Pure water | 76 | parts |
| Exemplified dye I-(10) | 4 | Parts |
| Example 7 | | |
| Glycerin | 15 | parts |
| N-methyl-2-pyrrolidone | 10 | parts |
| Pure water | 71 | parts |
| Exemplified dye I-(13) | 4 | Parts |
| Example 8 | | |
| Triethylene glycol | 20 | parts |
| Ethylene glycol monomethyl ether | 15 | parts |
| Pure water | 60 | parts |
| Exemplified dye I-(14) | 5 | Parts |
| Example 9 | | |
| Ethylene glycol | 25 | parts |

TABLE 1-continued

| | | |
|---|---|---|
| N-methyl-2-pyrrolidone | 10 | parts |
| Pure water | 61 | parts |
| Exemplified dye I-(15) | 4 | Parts |
| Example 10 | | |
| Diethylene glycol | 25 | parts |
| Polyethylene glycol | 10 | parts |
| N,N-dimethylimidazolidinone | 5 | parts |
| Pure water | 57 | parts |
| Exemplified dye I-(18) | 3 | Parts |
| Comparative Example 1 | | |
| Diethylene glycol | 30 | parts |
| Pure water | 67 | parts |
| C. I. Food Black 1 | 3 | Parts |
| Comparative Example 2 | | |
| Ethylene glycol | 20 | parts |
| Pure water | 76 | parts |
| C. I. Food Black 2 | 4 | Parts |

With the inks of the above Examples 1 to 10, solid printing was conducted by means of a recording apparatus (BJ-130, made by Canon K.K.) having an On-Demand type of multiple orifice head for conducting recording by giving heat energy to the ink in the recording head to form liquid droplets, thus preparing printed pieces in the size of 10×20 mm. The test paper used were paper recommended for Canon NP-6150, Canon NP-Dry, Noizidlerpaper, and Proberbond paper. The optical densities of the printed matters were all within the range of from 1.30 to 1.45. The water resistance of the print was evaluated by immersing the printed piece in stagnant water at 20° C. for 5 minutes and then measuring the degree of decrease of the optical density. All of the printed pieces exhibited the degree of the decrease of not more than 15%, and was sufficiently water-resistant. On the other hand, the inks of Comparative Examples 1 and 2 were tested for the water resistance in the same manner as above. The degree of decrease of the optical density was not less than 50% for all samples.

Further, printing was conducted on specified paper for Canon Color Bubble Jet Copier in the same manner as above, and the printed matter was kept standing in a test chamber in which ozone concentration was being maintained at 30 ppm for 2 hours. The color difference ($\Delta E^*ab$) caused by the standing in the test chamber was measured. The evaluation results are graded by the standards as below:

○: $\Delta E^*ab < 5$
Δ: $5 \leq \Delta E^*ab \leq 10$
x: $\Delta E^*ab > 10$

The printed matters prepared with the inks of Examples 1 to 10 were all evaluated as ○ ($\Delta E^*ab < 5$), showing no remarkable discoloration. On the contrary, that of Comparative Example 1 was evaluated as Δ, showing relatively slight discoloration, but that of Comparative Example 2 was evaluated as x, showing significant discoloration.

EXAMPLES 11 to 20 and COMPARATIVE EXAMPLES 3 and 4

The components shown below were mixed and dissolved, and the resulting solution was filtered under pressure through a filter having pores of 1 μm in diameter to obtain the inks of the examples and the comparative examples as shown in Table 2.

TABLE 2

| Example 11 | | |
|---|---|---|

TABLE 2-continued

| | | |
|---|---|---|
| Diethylene glycol | 30 | parts |
| Pure water | 67 | parts |
| Exemplified dye II-(1) | 3 | parts |
| Example 12 | | |
| Ethylene glycol | 25 | parts |
| Pure water | 71 | parts |
| Exemplified dye II-(3) | 4 | Parts |
| Example 13 | | |
| Glycerin | 15 | parts |
| Pure water | 82 | parts |
| Exemplified dye II-(5) | 3 | Parts |
| Example 14 | | |
| Diethylene glycol | 20 | parts |
| Pure water | 76 | parts |
| Exemplified dye II-(6) | 4 | Parts |
| Example 15 | | |
| Triethylene glycol | 20 | parts |
| N-methyl-2-pyrrolidone | 10 | parts |
| Pure water | 65 | parts |
| Exemplified dye II-(8) | 5 | parts |
| Example 16 | | |
| Glycerin | 20 | parts |
| Pure water | 77 | parts |
| Exemplified dye II-(10) | 3 | Parts |
| Example 17 | | |
| Polyethylene glycol 300 | 20 | parts |
| Glycerin | 10 | parts |
| Pure water | 66 | parts |
| Exemplified dye II-(11) | 4 | Parts |
| Example 18 | | |
| Diethylene glycol | 25 | parts |
| Ethylene glycol monomethyl ether | 10 | parts |
| Pure water | 60 | parts |
| Exemplified dye II-(13) | 5 | Parts |
| Example 19 | | |
| Ethylene glycol | 30 | parts |
| N-methyl-2-pyrrolidone | 5 | parts |
| Pure water | 61 | parts |
| Exemplified dye II-(16) | 4 | parts |
| Example 20 | | |
| Triethylene glycol | 25 | parts |
| Glycerin | 10 | parts |
| N,N-dimethylimidazolidinone | 5 | parts |
| Pure water | 55 | parts |
| Exemplified dye II-(18) | 5 | parts |
| Comparative Example 3 | | |
| Diethylene glycol | 30 | parts |
| Pure water | 65 | parts |
| C. I. Food Black 1 | 5 | Parts |
| Comparative Example 4 | | |
| Triethylene glycol | 25 | parts |
| Pure water | 71 | parts |
| C. I. Food Black 2 | 4 | Parts |

With the inks of the above Examples 11 to 20, solid printing was conducted by means of a recording apparatus (BJ-130, made by Canon K.K.) having an On-Demand type of multiple orifice head for conducting recording by giving heat energy to the ink in the recording head to form liquid droplets, thus preparing printed pieces in the size of 10×20 mm. The test papers used were papers recommended for Canon NP-6150, Canon NP-Dry, Noizidlerpaper, and Proberbond paper. The optical densities of the printed matters were all within the range of from 1.30 to 1.45. The water resistance of the print was evaluated by immersing the printed piece in stagnant water at 20° C. for 5 minutes and then measuring the degree of decrease of the optical density. All of the printed pieces exhibited the degree of the decrease of not more than 15%, and was sufficiently water-resistant. On the other hand, the inks of Comparative Examples 3 and 4 were tested for the water resistance in the same manner as above. The degree of decrease of the optical density was not less than 50% for all samples.

Further, printing was conducted on specified paper for Canon Color Bubble Jet Copier in the same manner as above, and the printed matter was kept standing in a test chamber in which ozone concentration was being maintained at 30 ppm for 2 hours. The color difference ($\Delta E^*ab$) caused by the standing in the test chamber was measured. The evaluation results are graded by the standards as below:

○: $\Delta E^*ab < 5$
Δ: $5 \leq \Delta E^*ab \leq 10$
x: $\Delta E^*ab > 10$

The printed matters prepared with the inks of Examples 11 to 20 were all evaluated as ○ ($\Delta E^*ab < 5$), showing no remarkable discoloration. On the contrary, that of Comparative Example 3 was evalutated as Δ, showing relatively slight discoloration, but that of Comparative Example 4 was evaluated as x, showing significant discoloration.

EXAMPLE 21

Inks (a) to (e) were prepared in the same manner as in Example 1 except that the dyes were changed respectively to the mixture having the composition as below.

| | | |
|---|---|---|
| (a): I-(1) | 1.5 | parts |
| II-(6) | 1.5 | parts |
| (b): I-(5) | 1.8 | parts |
| II-(12) | 1.2 | parts |
| (c): I-(8) | 2.0 | parts |
| II-(4) | 1.0 | part |
| (d): I-(8) | 2.0 | parts |
| II-(10) | 1.0 | part |
| (e): I-(17) | 1.0 | part |
| II-(2) | 2.0 | parts |

With these inks, printing was conducted on the aforementioned kinds of paper by means of the above recording apparatus BJ-130. The water-resistance was evaluated in the same manner as above, and was found that the degree of decrease of the optical density was not more than 15% for all the printed pieces. The discoloration by ozone was evaluated as above and was found that the $\Delta E^*ab$ value was less than 5 for all the printed pieces. Further, the printed pieces were exposed to indoor light for 6 months, and found that the color change after the 6 month exposure was less than 5 in terms of $\Delta E^*ab$.

EXAMPLE 22

The aforementioned printed matters of Examples 1 to 20 prepared by printing on specified paper for Canon Color-Bubble Jet Copier coated paper (made by Canon Inc., designated paper for BJ-A1) with the copying apparatus BJ-130 were tested for light-fastness by exposing light for 100 hours by Xenon fade-o-meter (made by Atlas Co.). The degree of decrease of the optical density was not higher than 30% for all the samples. On the contrary, that for the Comparative Examples 1 and 3 was higher than 60%.

Further, the discoloration of the above printed matters after 6 months of exposure to indoor light was less than 5 in terms of $\Delta E^*ab$, while that of Comparative Examples 2 and 4 was both more than 10.

From the description above, it is clear that inks which provides printed matters having light-fastness on non-coated paper or which provides printed matters having resistance to discoloration on coated paper are provided by selecting the dye having the specified structure as the coloring matter according to the present invention.

What is claimed is:

1. An ink comprising at least water, a water-soluble organic solvent, and a dye, the dye comprising a compound represented by the general formula (I):

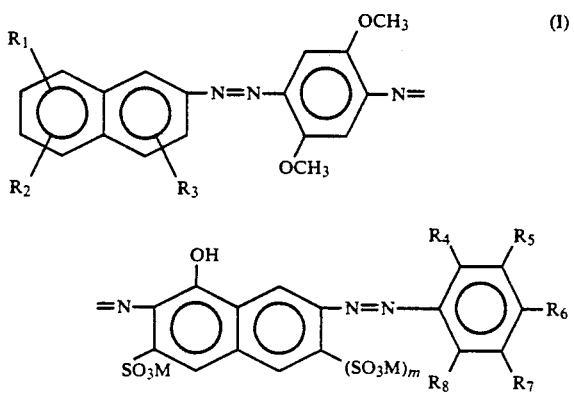

wherein $R_1$, $R_2$, and $R_3$ are respectively hydrogen or $SO_3M$; $R_4$ is hydrogen, $OCH_3$, $NH_2$, $NHCONH_2$, or $SO_3M$; $R_5$ is hydrogen or $SO_3M$; $R_6$ is hydrogen or $NH_2$; $R_7$ is hydrogen, $CH_3$, or $OCH_3$; $R_8$ is hydrogen, COOM, or $SO_3M$; $R_5$ is hydrogen and $R_8$ is COOM when both of $R_4$ and $R_6$ are respectively $NH_2$; M is an alkali metal, ammonium, or organic ammonium; and m is 0 or 1.

2. An ink according to claim 1, wherein one of $R_1$, $R_2$, and $R_3$ is $SO_3M$, m is 0, and two or three $SO_3M$ groups in total are included in the compound of the general formula (I).

3. An ink according to claim 1, wherein the ink contains the compound represented by the general formula (I) in an amount of from 0.2 to 20% by weight of the whole ink.

4. An ink according to claim 1, wherein the ink contains the water-soluble organic solvent in an amount of from 2 to 50% by weight of the whole ink.

5. An ink according to claim 1, wherein the ink contains the water in an amount of from 50 to 95 weight % of the whole ink.

6. An ink comprising at least water, a water-soluble organic solvent, and a dye, the dye comprising a compound represented by the general formula (II):

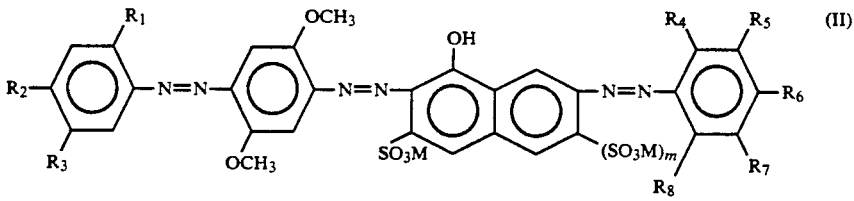

wherein $R_1$ is hydrogen, $CH_3$, COOM, or $SO_3M$; $R_2$ is hydrogen, $CH_3$, or COOM; $R_3$ is hydrogen, chlorine, COOM, or $SO_3M$; $R_4$ is hydrogen, $OCH_3$, $NH_2$, $NHCONH_2$, or $SO_3M$; $R_5$ is hydrogen or $SO_3M$; $R_6$ is hydrogen or $NH_2$; $R_7$ is hydrogen, $CH_3$, or $OCH_3$; $R_8$ is hydrogen, COOM, or $SO_3M$; $R_5$ is hydrogen and $R_8$ is COOM when both of $R_4$ and $R_6$ are respectively $NH_2$; M is an alkali metal, ammonium, or organic ammonium; and m is 0 or 1.

7. An ink according to claim 6, wherein none or one of $R_1$, $R_2$, and $R_3$ is $SO_3M$, none or one of $R_4$, $R_5$, $R_6$, $R_7$, and $R_8$ is $SO_3M$, m is 0, and two or three $SO_3M$ groups in total are included in the compound of the general formula (II).

8. An ink according to claim 6, wherein the ink contains the compound represented by the general formula (II) in an amount of from 0.2 to 20% by weight of the whole ink.

9. An ink according to claim 6, wherein the ink contains the water-soluble organic solvent in an amount of from 2 to 50% by weight of the whole ink.

10. An ink according to claim 6, wherein the ink contains the water in an amount of from 50 to 95 weight % of the whole ink.

11. An ink jet recording process of conducting recording by ejecting ink droplets from an orifice in response to a recording signal, the ink comprising at least water, a water-soluble organic solvent, and a dye, the dye comprising a compound represented by the general formula (I):

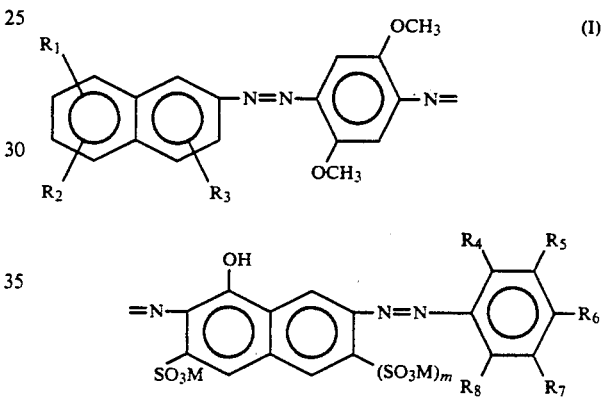

wherein $R_1$, $R_2$, and $R_3$ are respectively hydrogen or $SO_3M$; $R_4$ is hydrogen, $OCH_3$, $NH_2$, $NHCONH_2$, or $SO_3M$; $R_5$ is hydrogen or $SO_3M$; $R_6$ is hydrogen or $NH_2$; $R_7$ is hydrogen, $CH_3$, or $OCH_3$; $R_8$ is hydrogen, COOM, or $SO_3M$; $R_5$ is hydrogen and $R_8$ is COOM when both of $R_4$ and $R_6$ are respectively $NH_2$; M is an alkali metal, ammonium, or organic ammonium; and m is 0 or 1.

12. An ink jet recording process according to claim 11, wherein the ink droplets are ejected by action of thermal energy.

13. An ink jet recording process according to claim 11, wherein one of $R_1$, $R_2$, and $R_3$ is $SO_3M$, m is 0, and two or three $SO_3M$ groups in total are included in the compound of the general formula (I).

14. An ink jet recording process according to claim 11, wherein the ink contains the compound represented by the general formula (I) in an amount of from 0.2 to 20% by weight of the whole ink.

15. An ink jet recording process according to claim 11, wherein the ink contains the water-soluble organic solvent in an amount of from 2 to 50% by weight of the whole ink.

16. An ink jet recording process according to claim 11, wherein the ink contains the water in an amount of from 50 to 95 weight % of the whole ink.

17. An ink jet recording process according to claim 11, wherein the recording is conducted on pigment-coated paper.

18. An ink jet recording process of conducting recording by ejecting ink droplets from an orifice in response to a recording signal, the ink comprising at least water, a water-soluble organic solvent, and a dye, the dye comprising a compound represented by the general formula (II):

and a dye, the dye comprising a compound represented by the general formula (I):

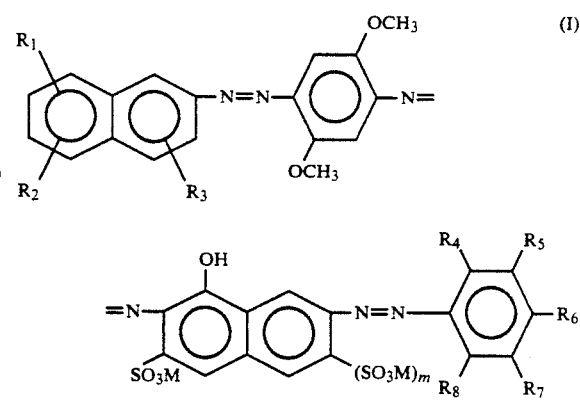

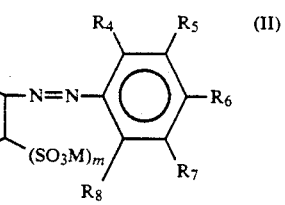 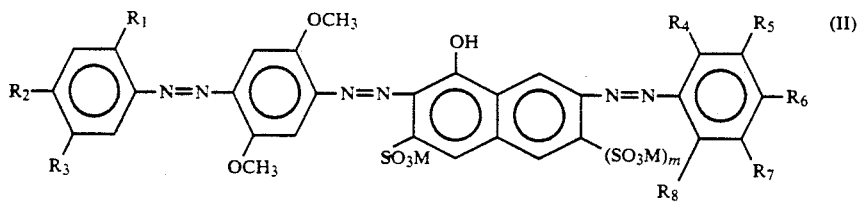

wherein $R_1$ is hydrogen, $CH_3$, COOM, or $SO_3M$; $R_2$ is hydrogen, $CH_3$, or COOM; $R_3$ is hydrogen, chlorine, COOM, or $SO_3M$; $R_4$ is hydrogen, $OCH_3$, $NH_2$, $NHCONH_2$, or $SO_3M$; $R_5$ is hydrogen or $SO_3M$; $R_6$ is hydrogen or $NH_2$; $R_7$ is hydrogen, $CH_3$, or $OCH_3$; $R_8$ is hydrogen, COOM, or $SO_3M$; $R_5$ is hydrogen and $R_8$ is COOM when both of $R_4$ and $R_6$ are respectively $NH_2$; M is an alkali metal, ammonium, or organic ammonium; and m is 0 or 1.

19. An ink jet recording process according to claim 18, wherein the ink droplets are ejected by action of thermal energy.

20. An ink jet recording process according to claim 18, wherein none or one of $R_1$, $R_2$, and $R_3$ is $SO_3M$, none or one of $R_4$, $R_5$, $R_6$, $R_7$, and $R_8$ is $SO_3M$, m is 0, and two or three $SO_3M$ groups in total are included in the compound of the general formula (II).

21. An ink recording process according to claim 18, wherein the ink contains the compound represented by the general formula (II) in an amount of from 0.2 to 20% by weight of the whole ink.

22. An ink jet recording process according to claim 18 wherein the ink contains the water-soluble organic solvent in an amount of from 2 to 50% by weight of the whole ink.

23. An ink jet recording process according to claim 18, wherein the ink contains the water in an amount of from 50 to 95 weight % of the whole ink.

24. An ink jet recording process according to claim 18, wherein the recording is conducted on pigment-coated paper.

25. An ink jet device comprising an ink storing member impregnated with a recording liquid, and a head having an orifice for ejecting the recording liquid as droplets, the recording liquid comprising an ink containing at least water, a water-soluble organic solvent, wherein $R_1$, $R_2$, and $R_3$ are respectively hydrogen or $SO_3M$; $R_4$ is hydrogen, $OCH_3$, $NH_2$, $NHCONH_2$, or $SO_3M$; $R_5$ is hydrogen or $SO_3M$; $R_6$ is hydrogen or $NH_2$; $R_7$ is hydrogen, $CH_3$, or $OCH_3$; $R_8$ is hydrogen, COOM, or $SO_3M$; $R_5$ is hydrogen and $R_8$ is COOM when both of $R_4$ and $R_6$ are respectively $NH_2$; M is an alkali metal, ammonium, or organic ammonium; and m is 0 or 1.

26. An ink jet device according to claim 25, wherein the ink storing member is an ink absorber or an ink bag.

27. An ink jet device according to claim 25, wherein the head has a heating head to provide to the ink a heat energy for ejecting ink droplets.

28. An ink jet device according to claim 25, wherein one of $R_1$, $R_2$, and $R_3$ is $SO_3M$, m is 0, and two or three $SO_3M$ groups in total are included in the compound of the general formula (I).

29. An ink jet device according to claim 25, wherein the ink contains the compound represented by the general formula (I) in an amount of from 0.2 to 20% by weight of the whole ink.

30. An ink jet device according to claim 25, wherein the ink contains the water-soluble organic solvent in an amount of from 2 to 50% by weight of the whole ink.

31. An ink jet device according to claim 25, wherein the ink contains the water in an amount of from 50 to 95 weight % of the whole ink.

32. An ink jet device comprising an ink storing member impregnated with a recording liquid, and a head having an orifice for ejecting the recording liquid as droplets, the recording liquid comprising an ink containing at least water, a water-soluble organic solvent, and a dye, the dye comprising a compound represented by the general formula (II):

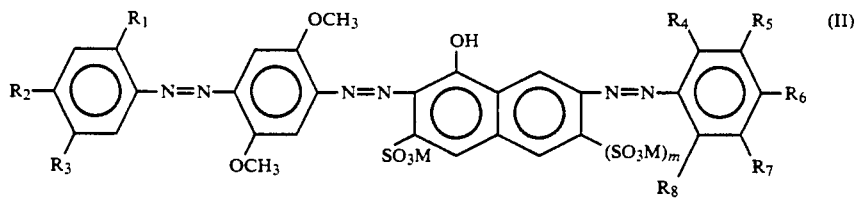

wherein $R_1$ is hydrogen, $CH_3$, COOM, or $SO_3M$; $R_2$ is hydrogen, $CH_3$, or COOM; $R_3$ is hydrogen, chlorine, COOM, or $SO_3M$; $R_4$ is hydrogen, $OCH_3$, $NH_2$, $NHCONH_2$, or $SO_3M$; $R_5$ is hydrogen or $SO_3M$; $R_6$ is hydrogen or $NH_2$; $R_7$ is hydrogen, $CH_3$, or $OCH_3$; $R_8$ is hydrogen, COOM, or $SO_3M$; $R_5$ is hydrogen and $R_8$ is COOM when both of $R_4$ and $R_6$ are respectively $NH_2$; M is an alkali metal, ammonium, or organic ammonium; and m is 0 or 1.

33. An ink jet device according to claim 32, wherein the ink storing member is an ink absorber or an ink bag.

34. An ink jet device according to claim 32, wherein the head has a heating head to provide to the ink a heat energy for ejecting ink droplets.

35. An ink jet device according to claim 32, wherein none or one of $R_1$, $R_2$, and $R_3$ is $SO_3M$, none or one of $R_4$, $R_5$, $R_6$, $R_7$, and $R_8$ is $SO_3M$, m is 0, and two or three $SO_3M$ groups in total are included in the compound of the general formula (II).

36. An ink jet device according to claim 32, wherein the ink contains the compound represented by the general formula (II) in an amount of from 0.2 to 20% by weight of the whole ink.

37. An ink jet device according to claim 32, wherein the ink contains the water-soluble organic solvent in an amount of from 2 to 50% by weight of the whole ink.

38. An ink jet device according to claim 32, wherein the ink contains the water in an amount of from 50 to 95 weight % of the whole ink.

39. An ink jet recording apparatus comprising an ink jet device comprising an ink storing member impregnated with a recording liquid, and a head having an orifice for ejecting the recording liquid, the recording liquid comprising an ink containing at least water, a water-soluble organic solvent, and a dye, the dye comprising a compound represented by the general formula (I):

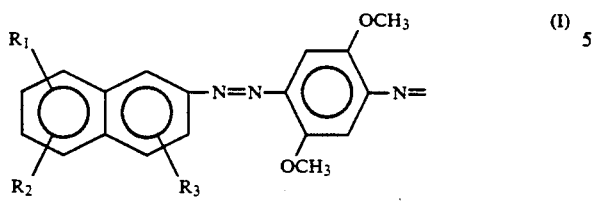

-continued

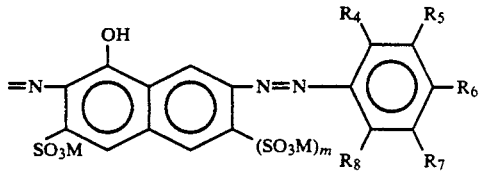

wherein $R_1$, $R_2$, and $R_3$ are respectively hydrogen or $SO_3M$; $R_4$ is hydrogen, $OCH_3$, $NH_2$, $NHCONH_2$, or $SO_3M$; $R_5$ is hydrogen or $SO_3M$; $R_6$ is hydrogen or $NH_2$; $R_7$ is hydrogen, $CH_3$, or $OCH_3$; $R_8$ is hydrogen, COOM, or $SO_3M$; $R_5$ is hydrogen and $R_8$ is COOM when both of $R_4$ and $R_6$ are respectively $NH_2$; M is an alkali metal, ammonium, or organic ammonium; and m is 0 or 1.

40. An ink jet recording apparatus according to claim 39, wherein the ink storing member is an ink absorber or an ink bag.

41. An ink jet recording apparatus according to claim 39, wherein the head has a heating head to provide to the ink a heat energy for ejecting ink droplets.

42. An ink jet recording apparatus according to claim 39, wherein one of $R_1$, $R_2$, and $R_3$ is $SO_3M$, m is 0, and two or three $SO_3M$ groups in total are included in the compound of the general formula (I).

43. An ink jet recording apparatus according to claim 39, wherein the ink contains the compound represented by the general formula (I) in an amount of from 0.2 to 20% by weight of the whole ink.

44. An ink jet recording apparatus according to claim 39, wherein the ink contains the water-soluble organic solvent in an amount of from 2 to 50% by weight of the whole ink.

45. An ink jet recording apparatus according to claim 39, wherein the ink contains the water in an amount of from 50 to 95 weight % of the whole ink.

46. An ink jet recording apparatus comprising an ink jet device comprising an ink storing member impregnated with a recording liquid, and a head having an orifice for ejecting the recording liquid, the recording liquid comprising an ink containing at least water, a water-soluble organic solvent, and a dye, the dye comprising a compound represented by the general formula (II):

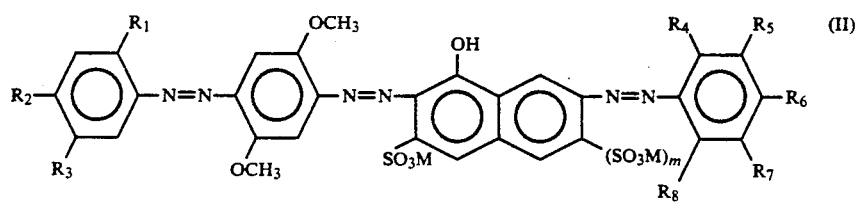

wherein $R_1$ is hydrogen, $CH_3$, COOM, or $SO_3M$; $R_2$ is hydrogen, $CH_3$, or COOM; $R_3$ is hydrogen, chlorine, COOM, or $SO_3M$; $R_4$ is hydrogen, $OCH_3$, $NH_2$, NHCONH$_2$, or SO$_3$M; R$_5$ is hydrogen or SO$_3$M; R$_6$ is hydrogen or NH$_2$; R$_7$ is hydrogen, CH$_3$, or OCH$_3$; R$_8$ is hydrogen, COOM, or SO$_3$M; R$_5$ is hydrogen and R$_8$ is COOM when both of R$_4$ and R$_6$ are respectively NH$_2$; M is an alkali metal, ammonium, or organic ammonium; and m is 0 or 1.

47. An ink jet recording apparatus according to claim 46, wherein the ink storing member is an ink absorber or an ink bag.

48. An ink jet recording apparatus according to claim 46, wherein the head has a heating head to provide to the ink a heat energy for ejecting ink droplets.

49. An ink jet recording apparatus according to claim 46, wherein none or one of R$_1$, R$_2$, and R$_3$ is SO$_3$M, none or one of R$_4$, R$_5$, R$_6$, R$_7$, and R$_8$ is SO$_3$M, m is 0, and two or three SO$_3$M groups in total are included in the compound of the general formula (II).

50. An ink jet recording apparatus according to claim 46, wherein the ink contains the compound represented by the general formula (II) in an amount of from 0.2 to 20% by weight of the whole ink.

51. An ink jet recording apparatus according to claim 46, wherein the ink contains the water-soluble organic solvent in an amount of from 2 to 50% by weight of the whole ink.

52. An ink jet recording apparatus according to claim 46, wherein the ink contains the water in an amount of from 50 to 95 weight % of the whole ink.

53. An ink cartridge comprising an ink bag impregnated with a recording liquid comprising an ink, the ink containing at least water, a water-soluble organic solvent, and a dye, the dye comprising a compound represented by the general formula (I):

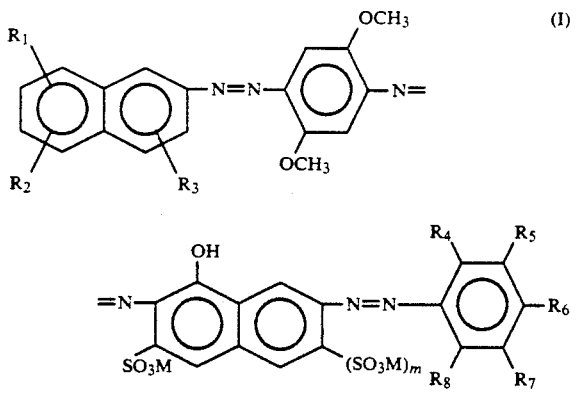

wherein R$_1$, R$_2$, and R$_3$ are respectively hydrogen or SO$_3$M; R$_4$ is hydrogen, OCH$_3$, NH$_2$, NHCONH$_2$, or SO$_3$M; R$_5$ is hydrogen or SO$_3$M; R$_6$ is hydrogen or NH$_2$; R$_7$ is hydrogen, CH$_3$, or OCH$_3$; R$_8$ is hydrogen, COOM, or SO$_3$M; R$_5$ is hydrogen and R$_8$ is COOM when both of R$_4$ and R$_6$ are respectively NH$_2$; M is an alkali metal, ammonium, or organic ammonium; and m is 0 or 1.

54. An ink cartridge according to claim 53, wherein one of R$_1$, R$_2$, and R$_3$ is SO$_3$M, m is 0, and two or three SO$_3$M groups in total are included in the compound of the general formula (I).

55. An ink cartridge according to claim 53, wherein the ink contains the compound represented by the general formula (I) in an amount of from 0.2 to 20% by weight of the whole ink.

56. An ink cartridge according to claim 53, wherein the ink contains the water-soluble organic solvent in an amount of from 2 to 50% by weight of the whole ink.

57. An ink cartridge according to claim 53, wherein the ink contains the water in an amount of from 50 to 95 weight % of the whole ink.

58. An ink cartridge comprising an ink bag impregnated with a recording liquid comprising an ink, the ink containing at least water, a water-soluble organic solvent, and a dye, the dye comprising a compound represented by the general formula (II):

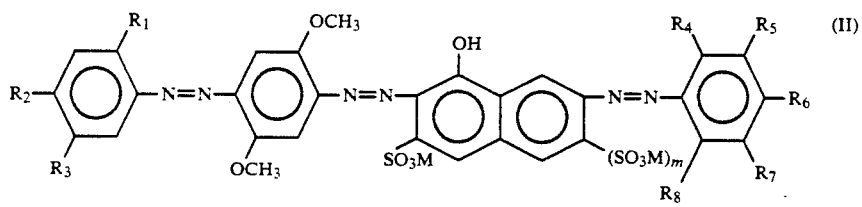

wherein R$_1$ is hydrogen, CH$_3$, COOM, or SO$_3$M; R$_2$ is hydrogen, CH$_3$, or COOM; R$_3$ is hydrogen, chlorine, COOM, or SO$_3$M; R$_4$ is hydrogen, OCH$_3$, NH$_2$, NHCONH$_2$, or SO$_3$M; R$_5$ is hydrogen or SO$_3$M; R$_6$ is hydrogen or NH$_2$; R$_7$ is hydrogen, CH$_3$, or OCH$_3$; R$_8$ is hydrogen, COOM, or SO$_3$M; R$_5$ is hydrogen and R$_8$ is COOM when both of R$_4$ and R$_6$ are respectively NH$_2$; M is an alkali metal, ammonium, or organic ammonium; and m is 0 or 1.

59. An ink cartridge according to claim 58, wherein none or one of R$_1$, R$_2$, and R$_3$ is SO$_3$M, none or one of R$_4$, R$_5$, R$_6$, R$_7$, and R$_8$ is SO$_3$M, m is 0, and two or three SO$_3$M groups in total are included in the compound of the general formula (II).

60. An ink cartridge according to claim 58, wherein the ink contains the compound represented by the general formula (II) in an amount of from 0.2 to 20% by weight of the whole ink.

61. An ink cartridge according to claim 58, wherein the ink contains the water-soluble organic solvent in an amount of from 2 to 50% by weight of the whole ink.

62. An ink cartridge according to claim 58, wherein the ink contains the water in an amount of from 50 to 95 weight % of the whole ink.

* * * * *

UNITED STATES PATENT AND TRADEMARK OFFICE
CERTIFICATE OF CORRECTION

PATENT NO. : 5,167,703
DATED : December 1, 1992
INVENTOR(S) : Eida et al.

It is certified that error appears in the above-identified patent and that said Letters Patent is hereby corrected as shown below:

COLUMN 1:

Line 20, "made improve" should read --made for improving--;
Line 48, "image" should read --images--; and
Line 59, "provides" should read --provide--.

COLUMN 2:

Line 26, "provide" should read --provides--.

COLUMN 4:

Line 4, "non-coated paper" should read --non-coated papers--.

COLUMN 6:

In the compound at line 47, "(I-(12)" should read --I-(12)--; and "M=NH($C_2H_3$)$_3$" should read --M=NH($C_2H_5$)$_3$--.

COLUMN 12:

Line 61, "tention" should read --tension--.

UNITED STATES PATENT AND TRADEMARK OFFICE
CERTIFICATE OF CORRECTION

PATENT NO. : 5,167,703

DATED : December 1, 1992

INVENTOR(S) : Eida et al.

It is certified that error appears in the above-identified patent and that said Letters Patent is hereby corrected as shown below:

COLUMN 13:

Line 28, "made" should read --is made--; and
Line 58, "abruptly generates heat" should read --generates heat abruptly--.

COLUMN 16:

Line 25, "paper" should read --papers--; and
Line 26, "paper" should read --papers--.

COLUMN 18:

Line 68, "provides" should read --provide--.

COLUMN 19:

Line 1, "provides" should read --provide--.

UNITED STATES PATENT AND TRADEMARK OFFICE
CERTIFICATE OF CORRECTION

PATENT NO. : 5,167,703
DATED : December 1, 1992
INVENTOR(S) : Eida et al.

It is certified that error appears in the above-identified patent and that said Letters Patent is hereby corrected as shown below:

<u>COLUMN 21</u>:

Line 50, "ink recording" should read --ink jet recording--.

Signed and Sealed this

Twelfth Day of May, 1998

Attest:

BRUCE LEHMAN

*Attesting Officer*  *Commissioner of Patents and Trademarks*